United States Patent [19]
Hibyan

[11] Patent Number: 4,549,852
[45] Date of Patent: Oct. 29, 1985

[54] HELICOPTER BLADE DROOP STOP WITH SLIDABLE DROOP STOP SEAT
[75] Inventor: Edward S. Hibyan, Trumbull, Conn.
[73] Assignee: United Technologies Corporation, Hartford, Conn.
[21] Appl. No.: 562,056
[22] Filed: Dec. 16, 1983
[51] Int. Cl.⁴ ............................................. B64C 27/38
[52] U.S. Cl. ..................................... 416/140; 416/141
[58] Field of Search .......... 416/134 A, 138 A, 140 A, 416/140 R, 141

[56] References Cited
U.S. PATENT DOCUMENTS

| | | | |
|---|---|---|---|
| 3,591,310 | 7/1971 | Mouille | 416/140 A |
| 3,778,189 | 12/1973 | Ferris | 416/140 |
| 3,853,426 | 12/1974 | Rybicki | 416/140 |
| 3,932,059 | 1/1976 | Rybicki | 416/140 |
| 4,203,708 | 5/1980 | Rybicki | 416/134 |
| 4,369,019 | 1/1983 | Lovera et al. | 416/134 |
| 4,419,051 | 12/1983 | DeRosa | 416/141 X |

Primary Examiner—Everette A. Powell, Jr.
Attorney, Agent, or Firm—Robert C. Walker

[57] ABSTRACT

Apparatus for supporting the rotor blades of a helicopter is disclosed. Support in droop under both statically and dynamically loaded conditions is discussed. The droop stop mechanism 34 has low susceptibility to the deleterious effects of snow/ice or dirt contamination. The droop stop seat 42 is mounted for rotation in a corresponding receptacle 50 at the base of the rotor blade assembly 14 and is slidable between static stop and dynamic stop positions along the pitch axis of the blade to be supported.

8 Claims, 2 Drawing Figures

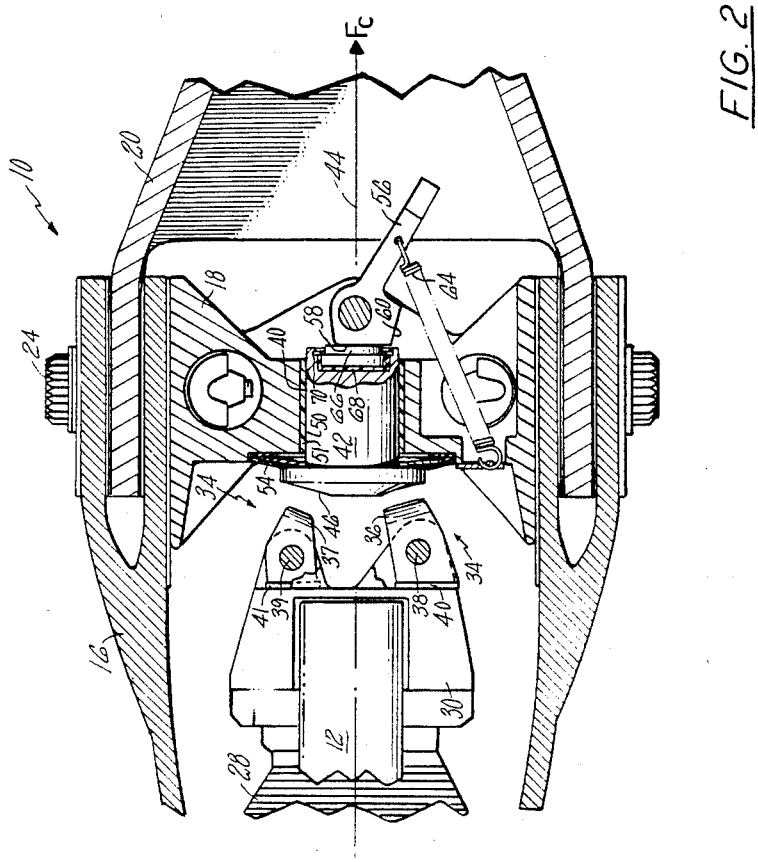

HELICOPTER BLADE DROOP STOP WITH SLIDABLE DROOP STOP SEAT

1. Technical Field

This invention relates to helicopter rotor assemblies and, more particularly to droop stop mechanisms preventing downward deflection of a helicopter rotor blade under both statically and dynamically loaded conditions.

2. Background Art

The concepts were developed for use with elastomeric bearing support systems joining the blades of the helicopter rotor to the rotor hub. In such a system, each blade is "universally" mounted to the rotor hub such that degrees of movement about the elastomeric bearing in pitch, lead/lag, and coning/droop are permitted. Pitch and lead/lag are actuated movements responding to flight control settings: coning/droop are unactuated movements responding to static and dynamic loadings on the rotor blade.

One early droop stop mechanism for use with elastomeric bearings is described in U.S. Pat. No. 3,778,189 to Ferris entitled "Elastomeric Helicopter Rotor Head with Dynamic and Static Coning and Droop Stops", of common assignee herewith. A pair of mating spherical surfaces is employed to accommodate universal movements of the blade about the bearing. A static stop having corresponding spherical surfaces is deployable therebetween to limit blade droop at low rotor speeds and at test.

Other droop stop mechanisms developed in later years are shown in U.S. Pat. No. 3,853,426 to Rybicki entitled "Elastomeric Helicopter Rotor Head with Dynamic and Static Blade Coning and Droop Stops" of common assignee herewith, and U.S. Pat. No. 4,369,019 to Lovera et al entitled "Helicopter Rotor Comprising Elastomeric Joints". Each is capable of rotating droop stop cams into opposition with a cam seat for limiting downward movement of the respective blade.

Notwithstanding the availability of the above blade support mechanisms, scientists and engineers in the helicopter industry have continued to seek yet improved mechanisms of simple and compact design. A specific object of the presently disclosed mechanism is reliable operation with decreased sensitivity to snow/ice or dirt contamination.

DISCLOSURE OF THE INVENTION

According to the present invention the droop stop seat of a helicopter rotor blade assembly is slidable along the pitch axis of the blade in response to rotational forces to a dynamic stop position and is retractable along the pitch axis to a static stop position in the absence of rotational forces.

According to a detailed aspect of the invention a cammed seat actuator having dynamic and static surfaces is mounted on the rotor blade outboard of the slidable droop stop seat and is rotatable in response to centrifugally generated forces on the cammed actuator for positioning the dynamic surface thereof in opposition to the stop seat under dynamically loaded blade conditions.

A primary feature of the present invention is the slidable droop stop seat. The seat has a conical surface which faces a fixed droop stop attached to the rotor hub, but is slidable so as to vary the amount of blade movement permitted before the seat rests upon the droop stop. A metallic plug in the end of the seat opposite the conical surface is rotatable therein with respect to the seat.

Other features include the dynamic stop surface and the static stop surface of the seat actuating cam which are positionable in response to rotational forces.

A principal advantage of the present invention is the simplicity of the droop stop mechanism and the ease with which the droop stop seat is rotatable within the blade notwithstanding high contact loads between the droop stop and the droop stop seat. The actuating cam sets the position of the droop stop seat by simple pivot about a single pin in response to rotational forces. The cylindrical portion of the droop stop seat is formed to a relatively small diameter, thus decreasing the susceptibility to the droop stop cam to deleterious effects of snow/ice or dirt contamination.

Other features and advantages will be apparent from the specification and claims and from the accompanying drawings which illustrate an embodiment of the invention.

BRIEF DESCRIPTION OF DRAWINGS

FIG. 2 is a view corresponding to FIG. 1 with the droop stop mechanism deployed under dynamically loaded conditions.

BEST MODE FOR CARRYING OUT THE INVENTION

Figure 1:
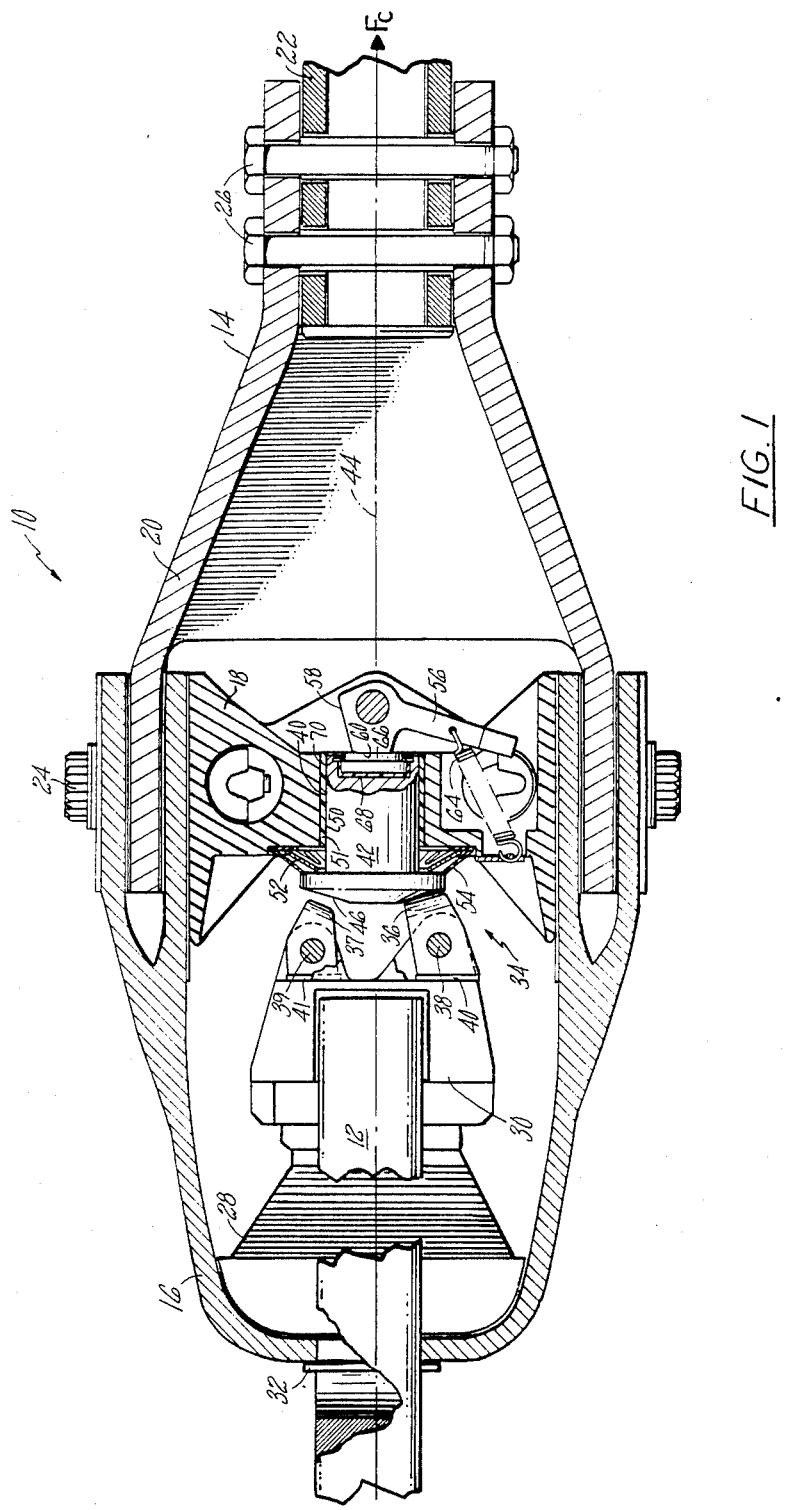
FIG. 1 is a simplified cross section view of a portion of the rotor hub assembly of a helicopter with the rotor at rest.

A simplified view of a portion of a helicopter rotor assembly 10 is illustrated in FIG. 1 with regions broken away to reveal internal elements of the assembly. Only the outermost region of the central hub 12 is shown with a single rotor blade assembly 14 extending radially outwardly therefrom. The blade assembly is formed of a base portion including a U-shaped yoke 16, a pitch horn 18, and a torque tube 20. An airfoil section 22 of the blade extends outwardly from the base portion. Bolts 24 and 26 join the airfoil section to the torque tube and the torque tube to the U-shaped yoke, respectively.

The blade assembly 14 is supported on the hub 12 by an elastomeric bearing 28. One end of the bearing is attached to the outermost section of the hub by bearing retainer and support means 30. The other end of the bearing is attached to the U-shaped yoke by bearing retaining clamp 32.

Attached to the bearing retainer and support means 30 is a portion of the droop stop mechanism 34. Droop stop 36 is attached to the support means 30 by a pin 38. A compliant material 40 is disposed behind the stop to support the pinned droop stop, yet permit slight rotation of the stop for purposes of alignment. Similarly, a flapping stop 37 is attached to the support means 30 by a pin 39. A compliant material 41 is disposed behind the stop to support the pinned flapping stop, yet permit slight rotation of the stop for purposes of alignment.

A droop stop seat 42 is mounted in the pitch horn 18 on the pitch axis 44 of the blade. The droop stop seat has a conical surface 46 facing toward the rotor hub and a cylindrical portion 48 extending into a receptacle 50 in the pitch horn. The descriptive term conical for purposes of this specification includes both true conical and frustoconical forms.

A teflon bearing sleeve 51 lines the receptacle of the pitch horn enabling the droop stop seat to not only rotate freely therein, but to slide freely along the pitch axis of the blade as well. Other bearing materials may also be used.

Means for sliding the droop stop seat 42 inwardly toward the droop stop 36, such as the spring washer 52, is disposed behind the conical surface 46 of the droop stop seat 42. The spring washer urges the droop stop seat into opposition with the droop stop at a first position for limiting, in conjunction with the droop stop, blade droop under statically loaded conditions. The restoring force can be set to predetermined desired levels by slotting the spring washer. In some embodiments a seal 54 is disposed about the spring washer 52 to further decrease the likelihood of dirt or other contaminants reaching the bearing sleeve 48.

Also mounted on the pitch horn 18 at a location radially outwardly of the droop stop seat 42 is means responsive to rotational forces on the rotor hub for sliding the droop stop seat along the pitch axis of the blade to a record position for limiting, in conjunction with the droop stop, blade droop under dynamically loaded conditions. As illustrated, such means is formed of a cammed actuator 56 having a dynamic surface 58 and a static surface 60. The actuator is attached to the pitch horn by a pin 62 and is rotatable thereabout. The actuator further has a weighted portion located remotely from the dynamic and static stop surfaces oriented so as to be capable of rotating the dynamic stop surface about the pin in response to rotational forces on the blade and into opposition with the end of the droop stop seat. A spring 64 attached at one end to the pitch horn and at the other end to the cammed actuator, restores, in the absence of rotational forces, the actuator to a static position with the static surface facing the end of the droop stop seat. A metallic plug 66 is housed within the end of the droop stop seat 42 which is opposite the conically surfaced end. The plug is mounted in a teflon bushing 68 disposed between the plug and the seat. Both the plug and the bushing are held in the end of the seat by a fastener, such as the snap ring 70. The plug is rotatable within the teflon bushing when contacted by the cammed actuator. In other embodiments a coating material may be directly applied to either the plug or the seat in substitution for the teflon bushing.

Blades installed in a helicopter rotor extend radially outwardly from the rotor hub on which the blades are mounted. Universal movement is permitted at the elastomeric bearing joining the blades to the hub. Such movement includes: rotation about the axis of the airfoil section of the blade, identified above as the pitch axis 44, for varying the angle of attack with which the airfoil section of the blade interacts with approaching flow; rotation in a direction inwardly and outwardly from the pane of the drawing about the elastomeric bearing, referred to as lead/lag; and motion on the plane of the drawing in a direction perpendicularly to the pitch axis, referred to as coning/drooping or, sometimes, as flapping.

The inventive concepts disclosed herein are best understood by first viewing the droop stop mechanism in the position illustrated in FIG. 1. As shown, the rotor assembly is at rest. The cammed actuator 56 is in the static position as retracted by the spring 64. Correspondingly, the droop stop seat 42 is located along the pitch axis of the blade at the static position. The static surface 60 of the actuator is in opposing relationship to the end of the droop stop seat. The static weight of the blade 14 causes the blade to pivot about the elastomeric bearing until the weight of the blade is fully supported by the droop stop mechanism, the condition illustrated.

In response to centrifugally generated or rotational forces as the helicopter rotor is engaged, the cammed actuator 56 is rotated about the pin 62 until the dynamic surface 58 opposes the end of the droop stop seat 42. Simultaneously, the droop stop slides within the receptacle to the dynamic position with conical surface 46 facing the droop stop 36 but spaced apart therefrom. With the dynamic surface of the actuator in opposition to the end of the droop stop seat, the blade has greater freedom of movement in droop than with the static surface 60 of the actuator in opposition to the end of the droop stop seat.

Although the droop stop is generally referred to as a fixed droop stop, in that the stop itself does not cycle between static and dynamic settings, the stop has limited freedom to rotate about the pin 38 for purposes of alignment with the conical surface 46 of the droop stop seat. The compliant material 40 supports the droop stop, yet permits limited movement. Further, the contact surface of the droop stop 36 is formed to an arcuate contour such that line contact with the conical surface 46 results at supported conditions.

The cylindrical portion of the droop stop seat is of a small diameter as compared to similarly rotatable seats of the prior art. Such construction has the distinct advantage of decreased resistance to rotation as the blade, while in engaging contact between droop stop and droop stop seat, is rotated about the pitch axis or is cycled to varying lead/lag positions. Significantly, reduced susceptibility to malfunction upon exposure to snow/ice or dirt contamination results. Diameters not greater than the the order of one and one-half ($1\frac{1}{2}$) to two (2) inches are known to be effective.

It should be understood that the invention is not limited to the particular embodiments shown and described herein, but that various changes and modifications may be made without departing from the spirit and scope of this novel concept as defined by the following claims.

I claim:

1. In a helicopter rotor hub assembly of the type having a plurality of rotor blades extending outwardly from a central hub, each blade joined thereto at an elastomeric bearing permitting universal movement of the mounted blade with respect to the hub, improved apparatus for supporting the blades under static and dynamic blade loads comprising:
   a droop stop mounted on the rotor hub and facing outwardly toward the airfoil section of the rotor blade to be supported; and
   a droop stop seat attached to the base of the rotor blade to be supported and having a conical surface at one end thereof facing inwardly toward the rotor hub in opposition to the fixed droop stop, wherein the droop stop seat is mounted on the pitch axis of the blade and is slidable along the pitch axis to a first position for limiting, in conjunction with the droop stop, blade droop under statically loaded conditions and to a second position for limiting, in conjunction with the droop stop, blade droop under dynamically loaded conditions.

2. The invention according to claim 1 which further includes means responsive to rotational forces on the rotor hub for sliding the droop stop seat along the pitch axis of the blade to said second position for limiting blade droop under dynamic blade loads.

3. The invention according to claim 2 which further includes means for sliding the droop stop seat along the pitch axis of the blade to said first position in the absence of rotational forces on the rotor hub for limiting blade droop under static blade loads.

4. The invention according to claim 3 where said means for sliding the droop stop seat along the pitch axis of the blade to said first position in the absence of rotational forces includes:
- a cammed seat actuator, having a dynamic surface and a static surface,
- a pin attaching the seat actuator to the blade in a manner affixing the seat actuator to the blade in proximity to the end of said droop stop seat opposite said conical surface, yet permitting rotation of the dynamic and static surface of the actuator about the pin; and
- a restoring spring attached at one end to the actuator and at the other end to the blade for rotating the actuator about the pin such that the static stop surface of the actuator opposes said end of the droop stop seat in the absence of rotational forces on the blade, wherein the cammed actuator further has a weighted portion located remotely from the dynamic and static surfaces and oriented so as to be capable of rotating the dynamic surface about the pin in response to rotational forces on the blade and into opposition with said end of the droop stop seat.

5. The invention according to claim 4 which further includes a plug disposed in the end of the slidable droop stop seat opposite said conically surfaced end where said plug is rotatable with respect to the seat when contacted by the cammed seat actuator.

6. The invention according to claim 1 wherein the droop stop mounted on the rotor hub is pinned thereto and rotatable about said pin for alignment of the droop stop when in contact with the droop stop seat.

7. The invention according to claim 6 which further includes a compliant material disposed between the droop stop and the rotor hub for supporting the pinned droop stop in a manner permitting limited rotation of the stop about the pin for purposes of alignment with the droop stop seat.

8. The invention according to claim 7 which further includes a flapping stop pinned to the rotor hub in a position opposing the droop stop seat wherein the flapping stop is rotatable about said pin for alignment of the flapping stop when in contact with the droop stop seat.

* * * * *